United States Patent
Hornung et al.

[11] Patent Number: 5,496,207
[45] Date of Patent: Mar. 5, 1996

[54] ORBITAL DISK GRINDER

[75] Inventors: Friedrich Hornung; Klaus Günther, both of Stuttgart; Bernd Upphoff, Leinfelden-Echterdingen; Julian Pfaundler, Filderstadt, all of Germany

[73] Assignee: Robert Bosch GmbH, Stuttgart, Germany

[21] Appl. No.: 133,025

[22] PCT Filed: Feb. 24, 1993

[86] PCT No.: PCT/DE93/00157

§ 371 Date: Oct. 8, 1993

§ 102(e) Date: Oct. 8, 1993

[87] PCT Pub. No.: WO93/17828

PCT Pub. Date: Sep. 16, 1993

[30] Foreign Application Priority Data

Mar. 4, 1992 [DE] Germany .................... 42 06 753.7

[51] Int. Cl.⁶ .................................................. B24B 23/03
[52] U.S. Cl. ...................... 451/357; 451/344; 451/294
[58] Field of Search ........................... 451/357, 354, 451/344, 294

[56] References Cited

U.S. PATENT DOCUMENTS

| 5,018,314 | 5/1991 | Fushiya et al. | 451/357 |
| 5,317,838 | 6/1994 | Bourner | 451/294 |

FOREIGN PATENT DOCUMENTS

| 0320599 | 6/1989 | European Pat. Off. . |
| 1142933 | 9/1957 | France . |
| 3103286 | 8/1982 | Germany . |

Primary Examiner—Robert A. Rose
Attorney, Agent, or Firm—Michael J. Striker

[57] ABSTRACT

An orbital disk grinder comprises a housing, grinding disk which can be applied to a working surface, a motor for moving the grinding disk so that the grinding disk gyrates in a circular orbit and simultaneously rotates about its axis, and speed control means operative for setting a speed of the grinding disk low when a normal force acting on the working surface is low, and high when the normal force acting on the working surface is high, so that a normal force acting on the grinding disk serves as a setting variable of the speed control means.

12 Claims, 2 Drawing Sheets

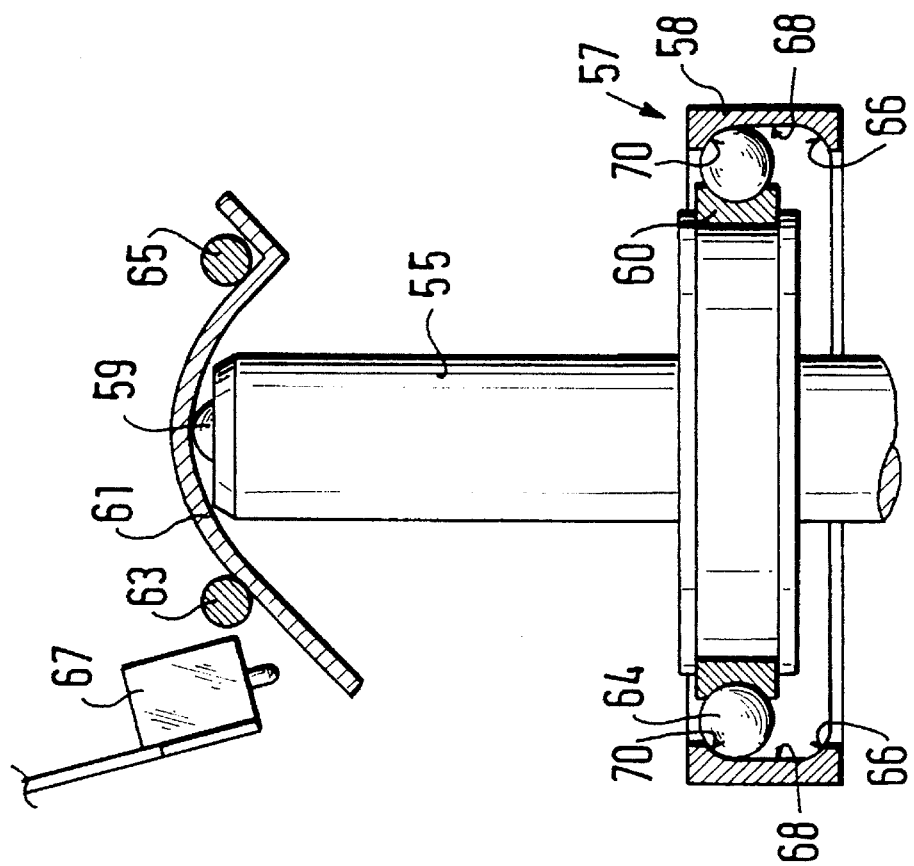
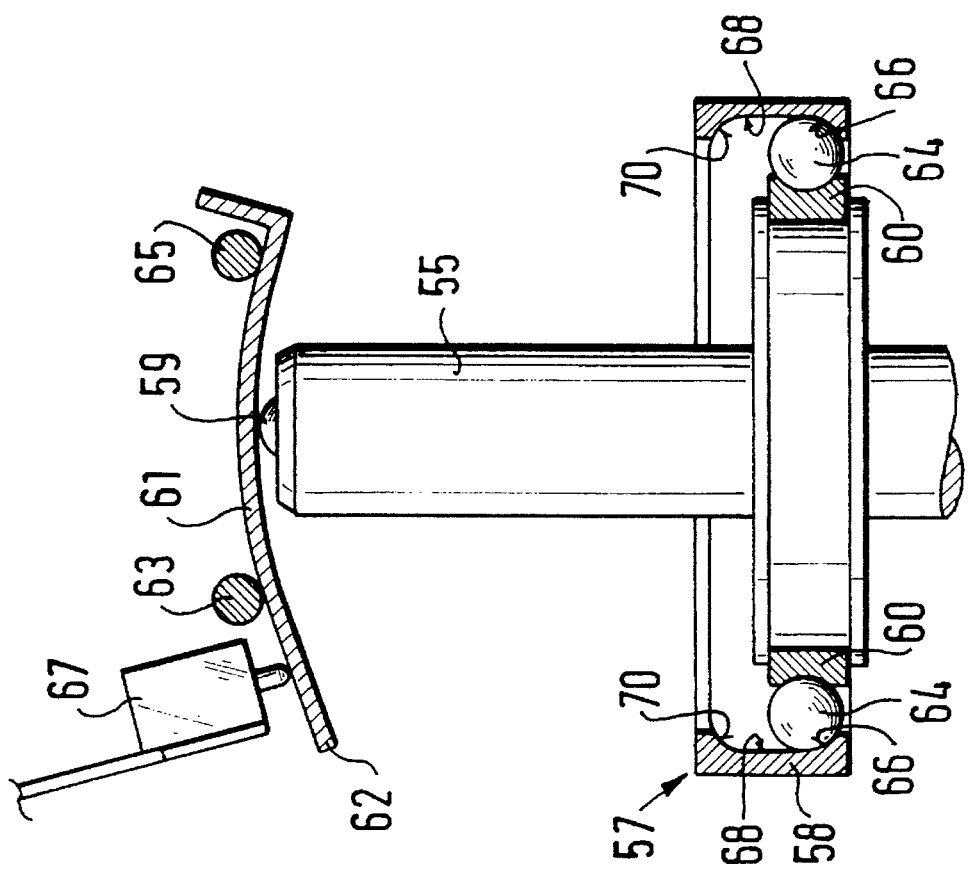

ORBITAL DISK GRINDER

BACKGROUND OF THE INVENTION

The present invention relates to an orbital disk grinder.

More particularly, it relates to an orbital disk grinder which has a housing accommodating a motor which moves a grinding disk via an output shaft while gyrating in a circular orbit and simultaneously rotating about its axis.

Orbital disk grinders of the generic type have been freely available on the market for many years. If they are lifted off the workpiece with the motor still running, these grinders have the disadvantage that in the fine processing stage i.e. whilst the grinding disk rotates about its axis, simply due to the bearing friction, at approx. 200 min$^{-1}$, resulting from the friction between the output shaft and the eccentric journal, the grinding plate accelerates to the idling speed of the output shaft, which is up to 13,000 r.p.m. This speed increase can result in so much material being removed when the grinding disk is applied to the workpiece, that irreparable damage to the workpiece surface occurs.

A further development of the orbital disk grinder of this type, in accordance with EP-PS 320 599, features an electromagnetic brake located between the grinding plate and the orbital disk grinder housing, which is intended to prevent a speed increase in the grinding disk. This electromagnetic brake is very effective, but has the disadvantage that additional braking energy is required in order to compensate for the acceleration energy. This results in wasted energy. Furthermore, greater design requirements are involved for the electromagnetic braking device, with the mass and volume of the orbital disk grinder increasing considerably.

From U.S. Pat. No. A 5,018,314, an orbital disk grinder is known which, based on the orbital disk grinder of this type, is intended to prevent the acceleration of the grinding disk by mechanical means. In this case too, the acceleration energy is "destroyed".

SUMMARY OF THE INVENTION

Accordingly, it is an object of the present invention to provide an orbital disk grinder, which avoids the disadvantages of the prior art.

In keeping with these objects and with others which will become apparent hereinafter, one feature of the present invention resides, briefly stated, in an orbital disk grinder in which speed control means is provided for setting the speed of the grinding disk preferably low when a normal force acting on a working surface is low and high when the normal force acting on the working surface is high, wherein the normal force acting on the grinding disk serves as a setting variable of a motor speed control.

When the orbital disk grinder is designed in accordance with the present invention, it has the advantage that by restricting the energy which is supplied to the motor, the acceleration effect does not even arise in the first place. This has the advantage that energy is saved, reductions in noise and vibration when idling are achieved, service life is increased, and the weight and volume of the orbital disk grinder are kept low.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows an enlarged section of a further embodiment example of an orbital disk grinder in the area of the control mechanism, and FIG. 3 shows the embodiment example of FIG. 2 in the second switching position possible.

DESCRIPTION OF THE PREFERRED EMBODIMENTS

Figure 1:
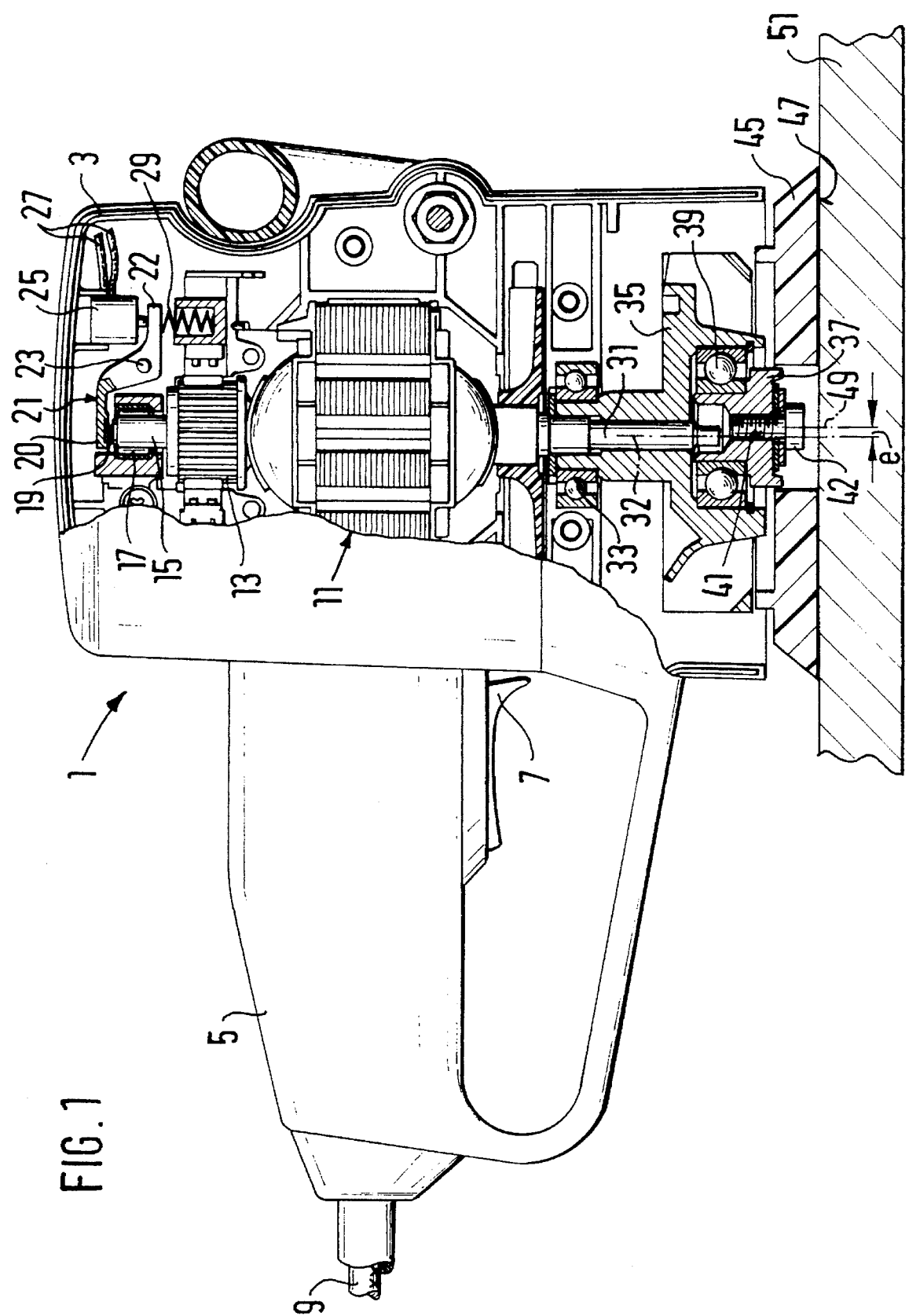
FIG. 1 shows a sectional side view of an embodiment example of the orbital disk grinder.

The orbital disk grinder 1 shown in part cross-section in FIG. 1, comprises a housing 3 with a handle 5, in which an on-/off switch 7 and a electrical connection cable 9 are located. Arranged in the interior of the housing 3 is a motor 11 with a commutator 13 and a shaft journal 15, running in an upper shaft bearing 17. At the face end of the shaft journal 15 is a ball 19, on which rests one end 20 of a two-arm lever 21. The two-arm lever 21 can be rocked about a fulcrum 23 in the housing 3. An end 22 of the two-arm lever 21, facing away from the shaft journal 15, rests against a micro-switch 25 with electrical connections 27, which lead to electronic control elements, not shown here, which are arranged between the electrical connection cable 9 and the electrical connections of the motor 11, not shown here. A pre-loaded return spring 29 rests on that end 22 of the two-arm lever 21 which rests on the micro-switch 25. This spring maintains both the micro-switch 25 and the shaft journal 15 in contact.

In that part of the housing 3 facing away from the upper-shaft bearing 17, is an output shaft 31 which rotates about its axis 32 and which is supported, axially slidable in a lower shaft bearing 33. Located at the free end of the output shaft 31 is a fixed eccentric support 35, which carries an eccentric journal 37. The eccentric journal 37 is displaced vis-a-vis axis 32 by an amount "e" (eccentricity), and runs in a ball race 39. Located in the eccentric journal 37 is a central tapped hole 41, in which a screw 42 firmly holds a grinding disk 45, fixedly on the eccentric journal 37. On the free side of the grinding disk 45, facing away from the housing, is a working surface 47.

The eccentric support 35 also serves as a fan, which is balanced, by virtue of the fact that the compensating masses are integrated into the fluidic structure.

When the output shaft 31 turns, the grinding plate 45 executes a gyrating motion about the axis 32 with the radius "e". At the same time, as a result of an intended friction in the ball race 39, the grinding disk 45 executes a rotation about its axis 49.

When the orbital disk grinder 1 is applied to a workpiece 51, its housing 3 displaces itself vis-a-vis the grinding plate 45 or the output shaft 31, due to its own weight, in such a way that the shaft journal 15 reaches its upper end position against the force of the return spring 29. In so doing, the two-arm lever 21 is swung clockwise against the force of the return spring 29, so that the micro-switch 25 is released, so that as a result of a spring acting in its interior, and not shown here, it assumes the "off" position.

If the orbital disk grinder 1 is lifted off the workpiece 51, the grinding plate 45 displaces itself axially away from the housing 3, whilst the output [drive] shaft 31 follows it, pushed by the force of the return spring 29. The shaft journal 15 is thus pushed into its bottom dead centre position. In so doing, the two-arm lever 21 follows it, anti-clockwise, in the direction of the force of the return spring 29. In this position, the micro-switch 25 is in the "on" position. The control electronics, not shown, in the output power circuit are thus activated and throttle the power supply to the motor 11 in such a way that the speed of the motor drops to a defined minimum.

Thus for example, the voltage supply of 220 V to the motor can be reduced to 80 V by means of a thyristor or a triac, through phase-cutting in the manner of a dimmer circuit. The motor speed thus drops from e.g. 13,000 r.p.m. to 4,000 r.p.m., and the highest possible disk speed, due to acceleration, can now reach a maximum of only 4,000 r.p.m., instead of the previous 13,000 r.p.m. if the grinding disk is re-applied to the workpiece 51, then at this speed of the grinding disk 45, only slightly more material can be removed than with fine grinding or with what was initially intended. After a few revolutions of the grinding disk, the polished section is completely evened out, and the intended quality of work is sure to be achieved.

When the grinding plate 45 is lifted off the workpiece 51, with the orbital disk grinder 1 in accordance with this invention, energy is saved when the motor is switched on, wear and noise are reduced, because the maximum drive output is made available only when it is actually needed.

The embodiment example of a control mechanism shown in FIG. 2 as a detail of an orbital disk grinder shows an upper shaft journal 55 in its lower end position, with an orbital disk grinder lifted off the work piece in normal position. The upper shaft journal 55 runs in a special ball race 57 with a specially designed, widened outer race 58. The end face of the shaft journal 55 is of a spherical design, preferably with a ball 59 being let in, on which rests a leaf spring 61, constantly in point contact, reducing wear. Furthermore, on the side facing away from the ball 59, the leaf spring 61 rests on two counter-bearings 63, 65. At the free end 62 of the leaf spring 61, a micro-switch 67 is supported. The micro-switch 67 is in its switched-on, or activated position, thereby conducting the electrical current via electronic switching elements, not shown here, which throttle the motor output.

An inner race 60 of the special ball race 57 is in an end position remote from the micro-switch 67, with the rolling body 64 coming to rest on the concave curve 66 of the track 68 of the special ball race 57. The lower end position of the shaft journal 55 is adopted as a result of the weight of the pre-loaded spring 61.

FIG. 3 shows the same embodiment example as FIG. 2, but in the upper end position of the shaft journal 55, with the orbital disk grinder applied to a workpiece, in the normal position. In this situation, the position of the shaft journal 55 is determined by the second concave curve 70 of the track of the special ball race 57. In this position, the leaf spring 61 is bent so severely that the free end 62 leaves a gap to the micro-switch 67. The micro-switch 67 is thus in its "off" position, in which the electronic switching elements are not active, and thus the electrical supply to the motor is not throttled.

It is apparent from FIGS. 2 and 3 that the leaf spring 61 not only provides the return force to produce the normal position of the output shaft, but also is an actuating element for switching the micro-switch 67 on and off.

In the case of an embodiment example, not shown here, of an orbital diskgrinder, a power-dependent switch, in particular a pressure sensor, is arranged instead of a path-dependent micro-switch.

It is taken as read that the embodiment examples described here are designed in such a way that the speed control also works in the case of overhead work, i.e. that the weight forces of the grinding plate have been taken into account in the design.

It will be understood that each of the elements described above, or two or more together, may also find a useful application in other types of constructions differing from the types described above.

While the invention has been illustrated and described as embodied in an orbital disk grinder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An orbital disk grinder, comprising a housing; a grinding disk which can be applied to a working surface; a motor for moving said grinding disk so that said grinding disk gyrates in a circular orbit and simultaneously rotates about its axis; and speed control means operative for setting a speed of said grinding disk low when a normal force acting on the working surface is low, and high when the normal force acting on the working surface is high, so that an axial force acting on said grinding disk serves as a setting variable of said speed control means, said speed control means including a micro-switch which picks up the normal force acting on the grinding disk and as soon as the normal force acting on the grinding disk is smaller than a reference force, sets a lower speed, while as soon as the normal force acting on the grinding disk is larger than the reference force, it sets a higher speed.

2. An orbital disk grinder, comprising a housing; a grinding disk which can be applied to a working surface; a motor for moving said grinding disk so that said grinding disk gyrates in a circular orbit and simultaneously rotates about its axis; speed control means operative for setting a speed of said grinding disk low when a normal force acting on the working surface is low, and high when the normal force acting on the working surface is high, so that an axial force acting on said grinding disk serves as a setting variable of said speed control means; an output shaft through which said motor moves said grinding disk; an eccentric support with which said output shaft is fixedly coupled; and an eccentric journal carried by said eccentric support and running in a rolling bearing, so as to be rotatable with a definite bearing friction and supported with a definite eccentricity relative to said output shaft, said eccentric journal being fixedly coupled to said grinding disk and gyrates about said axis.

3. An orbital disk grinder as defined in claim 1, wherein said speed control means further include a displacement device supportable on a workpiece and actuating said microswitch; and further comprising a control circuit which controls a power supply to said motor and is activated by said microswitch.

4. An orbital disk grinder as defined in claim 1, wherein said grinding disk is axially slidable and during its sliding actuates said micro-switch.

5. An orbital disk grinder as defined in claim 1, wherein said motor is axially slidable and during its sliding actuates said micro-switch.

6. An orbital disk grinder as defined in claim 4; and further comprising means providing a spring force, said grinding disk being slidable against said spring force.

7. An orbital disk grinder as defined in claim 4; and further comprising means providing a spring force, said motor being slidable against said spring force.

8. An orbital disk grinder as defined in claim 6; and further comprising detent means operative for arresting of said grinding disk in two axial positions.

9. An orbital disk grinder as defined in claim 8, wherein said detent means is operatable for arresting said grinding disk in said two axial positions which are opposite to one another.

10. An orbital disk grinder as defined in claim 1; and further comprising a leaf spring, said grinding disk being slidable so that at touchdown of the orbital disk grinder onto a workpiece, a sliding travel of said grinding disk is transmitted to said leaf spring, and said leaf spring actuates said micro-switch.

11. An orbital disk grinder as defined in claim 10; and further comprising counter-bearings on which said leaf spring is supported and pre-loaded; and a shaft arranged so that it is slidable by said grinding disk and a free end of said shaft deforms said pre-loaded leaf spring via point contact and a free end of said pre-loaded leaf spring actuates said micro-switch.

12. An orbital disk grinder as defined in claim 11; and further comprising a ball race having an inner race and an outer race, said shaft being axially slidable in said ball race between two end positions which are fixed within said ball race by said inner race being approximately of the same width as balls of said ball race, and a track of said outer race being approximately twice as wide as the balls.

* * * * *